(12) United States Patent
Zhou et al.

(10) Patent No.: US 10,425,608 B2
(45) Date of Patent: Sep. 24, 2019

(54) IMAGE PROCESSING METHOD AND CAMERA

(71) Applicant: Huawei Technologies Co., Ltd., Shenzhen (CN)

(72) Inventors: Bo Zhou, Beijing (CN); Yongjin Cai, Hangzhou (CN); Xilei Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 15/392,636

(22) Filed: Dec. 28, 2016

(65) Prior Publication Data

US 2017/0111604 A1 Apr. 20, 2017

Related U.S. Application Data (63) Continuation of application No. PCT/CN2015/082535, filed on Jun. 26, 2015.

(30) Foreign Application Priority Data

Jun. 30, 2014 (CN) .......................... 2014 1 0305120

(51) Int. Cl.
*H04N 5/445* (2011.01)
*H04N 5/232* (2006.01)
(Continued)

(52) U.S. Cl.
CPC ........... *H04N 5/44504* (2013.01); *G06T 3/40* (2013.01); *G06T 3/60* (2013.01); *H04N 5/232* (2013.01); *H04N 5/2628* (2013.01)

(58) Field of Classification Search
None
See application file for complete search history.

(56) References Cited

U.S. PATENT DOCUMENTS

| 5,363,297 A | 11/1994 | Larson et al. |
| 5,729,471 A | 3/1998 | Jain et al. |

(Continued)

FOREIGN PATENT DOCUMENTS

| CN | 101072301 A | 11/2007 |
| CN | 101266710 A | 9/2008 |

(Continued)

OTHER PUBLICATIONS

Machine Translation and Abstract of Japanese Publication No. JP2008283726, Nov. 20, 2008, 25 pages.

(Continued)

*Primary Examiner* — Clifford Hilaire
(74) *Attorney, Agent, or Firm* — Conley Rose, P.C.

(57) ABSTRACT

An image processing method and a camera are provided to implement that a relative position of an intelligent analysis rule relative to a corresponding reference object can remain unchanged when a camera with a pan tilt zoom (PTZ) function is rotated and/or zooms in/out. The method includes receiving an image operation instruction, where the image operation instruction includes performing at least one of a rotation operation or a zoom operation, performing an operation on an image according to the image operation instruction, where the image is overlaid with a rule which is a tripwire or a geometric region and includes a reference object, and displaying the rule on the image on which the operation has been performed such that a relative position of the rule relative to the reference object remains unchanged before and after the operation.

12 Claims, 5 Drawing Sheets

(51) Int. Cl.
*H04N 5/262* (2006.01)
*G06T 3/40* (2006.01)
*G06T 3/60* (2006.01)

(56) References Cited

U.S. PATENT DOCUMENTS

| | | | |
|---|---|---|---|
| 6,727,938 | B1 | 4/2004 | Randall |
| 2006/0139484 | A1 | 6/2006 | Seo et al. |
| 2006/0244826 | A1* | 11/2006 | Chew .................... G01S 3/7865 348/143 |
| 2007/0115355 | A1 | 5/2007 | McCormack |
| 2007/0266312 | A1 | 11/2007 | Ayaki et al. |
| 2009/0244327 | A1 | 10/2009 | Toguchi |
| 2009/0315712 | A1* | 12/2009 | Bloemendaal ..... G08B 13/1672 340/541 |
| 2010/0039548 | A1 | 2/2010 | Sakai |
| 2010/0245576 | A1* | 9/2010 | Inui ....................... G06T 7/0018 348/148 |
| 2012/0086780 | A1* | 4/2012 | Sharma .............. G06K 9/00771 348/46 |
| 2013/0178257 | A1* | 7/2013 | Langseth ................ G06T 17/05 463/4 |
| 2017/0039430 | A1 | 2/2017 | Funagi |

FOREIGN PATENT DOCUMENTS

| | | |
|---|---|---|
| CN | 102098499 A | 6/2011 |
| CN | 103024276 A | 4/2013 |
| CN | 103209290 A | 7/2013 |
| CN | 103544806 A | 1/2014 |
| EP | 1465115 A2 | 10/2004 |
| JP | H0981758 A | 3/1997 |
| JP | 2004129131 A | 4/2004 |
| JP | 2007306416 A | 11/2007 |
| JP | 2008283726 A | 11/2008 |
| JP | 2009239499 A | 10/2009 |
| JP | 2010045733 A | 2/2010 |
| JP | 2011234172 A | 11/2011 |
| JP | 2014011584 A | 1/2014 |
| WO | 2011031128 A1 | 3/2011 |
| WO | 2011083547 A1 | 7/2011 |

OTHER PUBLICATIONS

Foreign Communication From a Counterpart Application, Korean Application No. 10-2017-7001139, Korean Office Action dated Mar. 9, 2018, 6 pages.
Foreign Communication From a Counterpart Application, Korean Application No. 10-2017-7001139, English Translation of Korean Office Action dated Mar. 9, 2018, 4 pages.
Machine Translation and Abstract of Chinese Publication No. CN103024276, Apr. 3, 2013, 14 pages.
Machine Translation and Abstract of Chinese Publication No. CN102098499, Jun. 15, 2011, 23 pages.
Machine Translation and Abstract of Japanese Publication No. JP2011234172, Nov. 17, 2011, 24 pages.
Foreign Communication From a Counterpart Application, Chinese Application No. 201410305120.2, Chinese Office Action dated Jan. 2, 2018, 9 pages.
Haering, N., et al.,"The evolution of video surveillance: an overview," Machine Vision and Applications, vol. 19, No. 5-6, Springer, Apr. 30, 2008, 12 pages.
Foreign Communication From a Counterpart Application, European Application No. 15815512.7, European Office Action dated Jun. 7, 2018, 8 pages.
Machine Translation and Abstract of Japanese Publication No. JP2004129131, Apr. 22, 2004, 18 pages.
Machine Translation and Abstract of Japanese Publication No. JPH0981758, Mar. 28, 1997, 12 pages.
Foreign Communication From a Counterpart Application, Japanese Application No. 2017-519769, Japanese Office Action dated May 8, 2018, 5 pages.
Foreign Communication From a Counterpart Application, Japanese Application No. 2017-519769, English Translation of Japanese Office Action dated May 8, 2018, 5 pages.
Machine Translation and Abstract of Chinese Publication No. CN101072301, Nov. 14, 2007, 27 pages.
Foreign Communication From a Counterpart Application, Chinese Application No. 201410305120.2, Chinese Office Action dated Aug. 1, 2018, 9 pages.
Machine Translation and Abstract of Chinese Publication No. CN101266710, Sep. 17, 2008, 7 pages.
Machine Translation and Abstract of Chinese Publication No. CN103209290, Sep. 17, 2013, 9 pages.
Machine Translation and Abstract of Chinese Publication No. CN103544806, Jan. 29, 2014, 7 pages.
Foreign Communication From a Counterpart Application, European Appication No. 15815512.7, Extended European Search Report dated Jun. 19, 2017, 8 pages.
Foreign Communication From a Counterpart Application, PCT Application No. PCT/CN2015/082535, English Translation of International Search Report dated Sep. 30, 2015, 2 pages.
Foreign Communication From a Counterpart Application, PCT Application No. PCT/CN2015/082535, English Translation of Written Opinion dated Sep. 30, 2015, 7 pages.

* cited by examiner

IMAGE PROCESSING METHOD AND CAMERA

CROSS-REFERENCE TO RELATED APPLICATIONS

This application is a continuation of International Patent Application No. PCT/CN2015/082535 filed on Jun. 26, 2015, which claims priority to Chinese Patent Application No. 201410305120.2 filed on Jun. 30, 2014. The disclosures of the aforementioned applications are hereby incorporated by reference in their entireties.

TECHNICAL FIELD

The present disclosure relates to the field of video surveillance, and in particular, to an image processing method and a camera.

BACKGROUND

In the field of video surveillance, because of inconvenience brought by manual surveillance and an increasingly mature intelligent analysis algorithm, intelligent analysis is more widely applied.

Intelligent analysis is generally applied to a fixed digital camera, that is, a related intelligent analysis rule is set in the fixed digital camera, and then, an intelligent analysis function is normally used. The digital camera needs to be fixed in order to ensure normal use of the intelligent analysis function when intelligent analysis is used on a digital camera provided with a pan tilt zoom (PTZ) (for example PTZ full-sphere (up and down, left and right) moving and lens zoom, and zoom control) function. However, it is obviously a waste of resources. If the digital camera is not fixed, when the camera is rotated or zooms in/out, the intelligent analysis rule that is set previously may fail and cannot function.

SUMMARY

Embodiments of the present disclosure provide an image processing method and a camera such that when a camera with a PTZ function is rotated and/or zooms in/out, a relative position of an intelligent analysis rule relative to a corresponding reference object can remain unchanged.

According to a first aspect, an image processing method is provided, where the method includes receiving an image operation instruction, where the image operation instruction includes performing at least one of a rotation operation or a zoom operation, performing an operation on an image according to the image operation instruction, where the image is overlaid with a rule which is a tripwire or a geometric region and includes a reference object for the rule, and displaying the rule on the image on which the operation has been performed such that a relative position of the rule relative to the reference object remains unchanged before and after the operation.

With reference to the first aspect, in a first implementation manner of the first aspect, displaying the rule on the image on which the operation has been performed such that a relative position of the rule relative to the reference object remains unchanged before and after the operation includes establishing a coordinate system, and calculating coordinates of the rule in the coordinate system after the operation, and displaying, according to the coordinates of the rule after the operation, the rule on the image on which the operation has been performed such that the relative position of the rule relative to the reference object remains unchanged before and after the operation.

With reference to the first implementation manner of the first aspect, in a second implementation manner of the first aspect, calculating coordinates of the rule after the operation includes calculating an operation parameter, where the operation parameter includes at least one of a rotation angle or a zoom ratio, and calculating, according to the operation parameter, the coordinates of the rule after the operation.

With reference to the second implementation manner of the first aspect, in a third implementation manner of the first aspect, the image operation instruction is performing a rotation operation, calculating an operation parameter includes calculating a rotation angle, and calculating, according to the operation parameter, the coordinates of the rule after the operation includes calculating, according to the calculated rotation angle, the coordinates of the rule after the operation.

With reference to the third implementation manner of the first aspect, in a fourth implementation manner of the first aspect, calculating, according to the calculated rotation angle, the coordinates of the rule after the operation includes selecting a reference point in the rule and determining coordinates of the reference point before an operation, calculating, according to the calculated rotation angle and the coordinates of the reference point before the operation, coordinates of a dome camera that are corresponding to a current picture when the reference point is rotated to a picture center, calculating, according to the coordinates of the dome camera that are corresponding to the current picture when the reference point is rotated to the picture center, coordinates of the reference point after the operation, and determining, according to the coordinates of the reference point after the operation, the coordinates of the rule after the operation.

With reference to the second implementation manner of the first aspect, in a fifth implementation manner of the first aspect, the image operation instruction is performing a zoom operation. Calculating an operation parameter includes calculating a zoom ratio, and calculating, according to the operation parameter, the coordinates of the rule after the operation includes calculating, according to the calculated zoom ratio, the coordinates of the rule after the operation.

With reference to the second implementation manner of the first aspect, in a sixth implementation manner of the first aspect, the image operation instruction is performing a rotation operation and a zoom operation. Calculating an operation parameter includes calculating a rotation angle and a zoom ratio, and calculating, according to the operation parameter, the coordinates of the rule after the operation includes calculating, according to the rotation angle and the zoom ratio that are calculated, the coordinates of the rule after the operation.

With reference to the sixth implementation manner of the first aspect, in a seventh implementation manner of the first aspect, calculating, according to the rotation angle and the zoom ratio that are calculated, the coordinates of the rule after the operation includes selecting a reference point in the rule and determining coordinates of the reference point before an operation, calculating, according to the rotation angle and the zoom ratio that are calculated and the coordinates of the reference point before the operation, coordinates of a dome camera that are corresponding to a current picture when the reference point is rotated to a picture center, calculating, according to the coordinates of the dome camera that are corresponding to the current picture when the reference point is rotated to the picture center, coordinates of the reference point after the operation, and determining, according to the coordinates of the reference point after the operation, the coordinates of the rule after the operation.

With reference to the first aspect, in an eighth implementation manner of the first aspect, the image on which the operation has been performed is a first image, and the method further includes setting an effective condition for the first image, and redisplaying the first image when the effective condition is satisfied.

With reference to the eighth possible implementation manner of the first aspect, in a ninth implementation manner of the first aspect, the method further includes displaying an image that is obtained after the subsequent operation is performed when the effective condition is not satisfied and a subsequent operation is performed on the image.

With reference to the eighth or ninth implementation manner of the first aspect, in a tenth implementation manner of the first aspect, the effective condition includes effective time.

According to a second aspect, a camera is provided, where the camera includes a central processing unit (CPU) configured to receive an image operation instruction, where the image operation instruction includes performing at least one of a rotation operation or a zoom operation, where the CPU is further configured to perform an operation on an image according to the image operation instruction, where the image is overlaid with a rule which is a tripwire or a geometric region and includes a reference object for the rule, and an encoding processor is configured to display the rule on the image on which the CPU has performed the operation such that the relative position of the rule relative to the reference object remains unchanged before and after the operation.

With reference to the second aspect, in a first possible implementation manner of the second aspect, the CPU is further configured to calculate coordinates of the rule in a pre-established coordinate system after the operation, and the encoding processor is further configured to display, according to the coordinates of the rule after the operation, the rule on the image on which the operation has been performed such that the relative position of the rule relative to the reference object remains unchanged before and after the operation.

With reference to the first possible implementation manner of the second aspect, in a second possible implementation manner of the second aspect, the CPU is further configured to acquire an operation parameter, where the operation parameter includes at least one of a rotation angle or a zoom ratio, and calculate, according to the operation parameter, the coordinates of the rule in the pre-established coordinate system after the operation.

With reference to the second possible implementation manner of the second aspect, in a third possible implementation manner of the second aspect, the camera further includes a motor control board, where when the image operation instruction is performing a rotation operation, the motor control board is configured to calculate a rotation angle, and notify the CPU of the calculated rotation angle, and the CPU is further configured to calculate, according to the rotation angle notified by the motor control board, the coordinates of the rule in the pre-established coordinate system after the operation.

With reference to the third possible implementation manner of the second aspect, in a fourth possible implementation manner of the second aspect, the CPU is further configured to determine coordinates of a preselected reference point in the rule before an operation, calculate, according to the calculated rotation angle and the coordinates of the reference point before the operation, coordinates of a dome camera that are corresponding to a current picture when the reference point is rotated to a picture center, calculate, according to the coordinates of the dome camera that are corresponding to the current picture when the reference point is rotated to the picture center, coordinates of the reference point after the operation, and determine, according to the coordinates of the reference point after the operation, the coordinates of the rule after the operation.

With reference to the second possible implementation manner of the second aspect, in a fifth possible implementation manner of the second aspect, the encoding processor is further configured to calculate a zoom ratio, and the CPU is further configured to calculate, according to the zoom ratio calculated by the encoding processor, the coordinates of the rule after the operation.

With reference to the second possible implementation manner of the second aspect, in a sixth possible implementation manner of the second aspect, the camera further includes a motor control board, where when the image operation instruction is performing a rotation operation and a zoom operation, the motor control board is configured to calculate a rotation angle. The encoding processor is further configured to calculate a zoom ratio when the image operation instruction is performing a rotation operation and a zoom operation, and the CPU is further configured to calculate, according to the rotation angle calculated by the motor control board and the zoom ratio calculated by the encoding processor, the coordinates of the rule after the operation.

With reference to the sixth possible implementation manner of the second aspect, in a seventh possible implementation manner of the second aspect, the CPU is further configured to select a reference point in the rule and determine coordinates of the reference point before an operation, calculate, according to the rotation angle and the zoom ratio that are calculated and the coordinates of the reference point before the operation, coordinates of a dome camera that are corresponding to a current picture when the reference point is rotated to a picture center, calculate, according to the coordinates of the dome camera that are corresponding to the current picture when the reference point is rotated to the picture center, coordinates of the reference point after the operation, and determine, according to the coordinates of the reference point after the operation, the coordinates of the rule after the operation.

With reference to the second aspect, in an eighth possible implementation manner of the second aspect, the CPU is further configured to set an effective condition for the image on which the operation has been performed, and redisplay the first image when the effective condition is satisfied.

By means of the foregoing technical solutions, in the image processing method and the camera that are provided in the embodiments of the present disclosure, when an image operation instruction is being received and a corresponding operation is being performed on an image, a rule on the image is adjusted such that a relative position of the rule, displayed on the image on which the operation has been performed, relative to a reference object remains unchanged before and after the operation.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
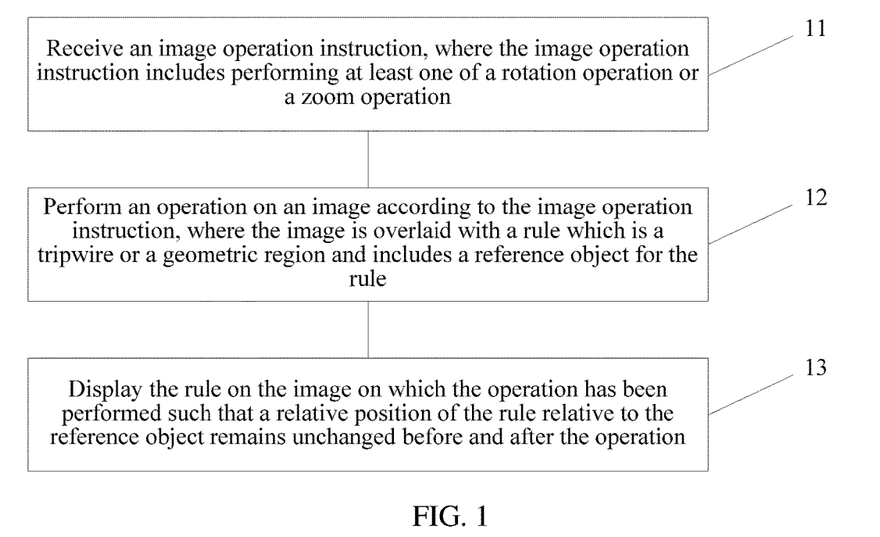
FIG. 1 is a flowchart of an image processing method according to an embodiment of the present disclosure.

FIG. 1 is a flowchart of an image processing method according to an embodiment of the present disclosure. Referring to FIG. 1, this embodiment of the present disclosure provides an image processing method, which is described based on a camera. The method includes the following steps.

Step 11: Receive an image operation instruction, where the image operation instruction includes performing at least one of a rotation operation or a zoom operation.

The image operation instruction is used to instruct to perform an operation on an image in a camera lens. The image operation instruction may be a rotation operation instruction used to perform a rotation operation on the image and a zoom operation instruction used to perform a zoom operation on the image. In this embodiment of the present disclosure, performing a rotation operation on the image refers to rotating the camera lens to rotate the image.

The image operation instruction may be sent by a user according to actual requirements.

Step 12: Perform an operation on an image according to the image operation instruction, where the image is overlaid with a rule which is a tripwire or a geometric region and includes a reference object for the rule.

When the user instructs a camera to perform the rotation operation, the camera performs a corresponding rotation operation on the image after receiving the rotation operation instruction. The rotation operation may be, for example, rotating to the left or right, or rotating downwards or upwards. Rotating to the left is used as an example. The camera controls the lens to rotate to the left when the user instructs the camera to rotate to the left, and in this case, an image displayed in the lens correspondingly changes.

Similarly, when the user instructs the camera to zoom in/out, an image displayed in the camera lens also needs to be changed, that is, corresponding zoom adjustment needs to be performed on the image.

In this embodiment of the present disclosure, the image displayed in the camera lens is overlaid with an intelligent analysis rule, and the intelligent analysis rule may be a tripwire rule or a geometric region rule.

"The reference object" in this embodiment of the present disclosure is relative to the rule, and refers to a person or an object of interest on the image shot by the camera lens, that is, a person or an object of interest on the shot image is selected as a reference object. The reference object is related to the intelligent analysis rule that is overlaid on the image and that is relative to the reference object. In addition, different intelligent analysis rules may be set respectively for different reference objects on the image.

Step 13: Display the rule on the image on which the operation has been performed such that a relative position of the rule relative to the reference object remains unchanged before and after the operation.

Further, in this step, if the reference object and the rule related to the reference object still exist on the image on which the operation has been performed, the reference object and the rule related to the reference object are displayed on the image on which the operation has been performed such that the relative position of the rule relative to the reference object remains unchanged before and after the operation.

Figure 2A:
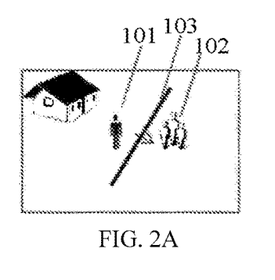
FIG. 2A, FIG. 2B, and FIG. 2C are schematic effect diagram of an application of an image processing method according to an embodiment of the present disclosure.
Figure 2B:
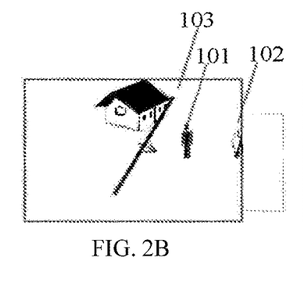
Figure 2C:
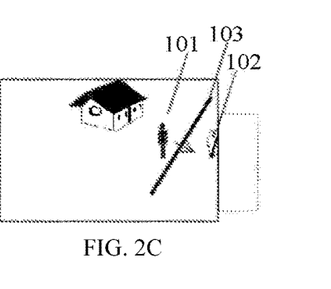

FIG. 2A, FIG. 2B, and FIG. 2C are schematic effect diagram of the image processing method according to this embodiment of the present disclosure. FIG. 2A, FIG. 2B, and FIG. 2C gives a description using an example in which the rule is a tripwire. Referring to FIG. 2A, FIG. 2B, and FIG. 2C, reference objects in FIG. 2A, FIG. 2B, and FIG. 2C are 101 and 102, and the tripwire rule relative to the reference objects 101 and 102 is 103. In this embodiment of the present disclosure, it can be ensured that after a rotation or zoom operation is performed on the image, a relative position of the tripwire rule 103 relative to the reference object 101 and a relative position of the tripwire rule 103 relative to the reference object 102 remain unchanged.

Further, FIG. 2A displays an original image including the tripwire rule before the rotation operation starts. Referring to FIG. 2A, before the rotation, the tripwire rule 103 is set between the reference objects 101 and 102. FIG. 2B displays an image that is obtained after the original image is rotated to the left by an angle (it is assumed that the angle is 30 degrees) if the technical solutions of the present disclosure are not used. It can be known from FIG. 2B that after the original image is rotated, the tripwire rule 103 is not located between the reference objects 101 and 102, that is, the relative position of the tripwire rule 103 relative to the reference object 101 and the relative position of the tripwire rule 103 relative to the reference object 102 have changed. FIG. 2C displays an image that is obtained after the original image is rotated to the left by an angle (it is assumed that the angle is 30 degrees) if the technical solutions of the present disclosure are used. It can be known from FIG. 2C that after the original image is rotated, the tripwire rule 103 is still located between the reference objects 101 and 102, that is, it is ensured that the relative position of the tripwire rule 103 relative to the reference object 101 and the relative position of the tripwire rule 103 relative to the reference object 102 remain unchanged before and after the operation.

In this embodiment of the present disclosure, before displaying the rule in step 13, to ensure that the relative position of the rule relative to the reference object remains unchanged before and after the operation, the rule corresponding to the reference object may be adjusted first. The adjustment may be, for example, clearing the rule that corresponds to the reference object and that is before the operation, calculating a rule of the reference object after the operation, and displaying the calculated rule of the reference object on the image on which the operation has been performed such that the relative position of the calculated rule, relative to the reference object, of the reference object remains unchanged before and after the operation, or skipping clearing the rule that corresponds to the reference object and that is before the operation, and instead, moving the rule that corresponds to the reference object and that is before the operation to an appropriate position on the image on which the operation has been performed such that the relative position of the rule, relative to the reference object, corresponding to the reference object remains unchanged before and after the operation.

In the image processing method provided in this embodiment of the present disclosure, when an image operation instruction is being received and a corresponding operation is being performed on an image, a rule on the image is adjusted such that a relative position of the rule, displayed on the image on which the operation has been performed, relative to a reference object remains unchanged before and after the operation.

Optionally, in an embodiment of the present disclosure, in step 13, displaying the rule on the image on which the operation has been performed such that a relative position of the rule relative to the reference object remains unchanged before and after the operation may include establishing a coordinate system, and calculating coordinates of the rule in the coordinate system after the operation, and displaying, according to the coordinates of the rule after the operation, the rule on the image on which the operation has been performed such that the relative position of the rule relative to the reference object remains unchanged before and after the operation.

The coordinate system may be a two-dimensional coordinate system, and the two dimensions may be a horizontal direction and a vertical direction. In this embodiment of the present disclosure, a sensor center (that is, a picture center) may be used as an origin of the two-dimensional coordinate system. In this way, coordinates of points and coordinates of a rule on the image of the camera before and after the operation may be recorded.

In this embodiment of the present disclosure, only some representative points on the rule may be selected to replace the rule. For example, for a tripwire rule, coordinates of two end points of the tripwire may be selected, and not coordinates of all points on the whole tripwire are selected. Similarly, for a geometric region rule, such as a rectangle rule, only coordinates of four end points of the rectangle may be selected. For another example, for a triangle rule, only coordinates of three end points of the triangle may be selected. A manner of selecting coordinate points of other geometric region rules is similar to those described above, and details are not described herein again.

In this embodiment of the present disclosure, coordinates of the points on the rule and on the image before and after the operation may be uniquely determined by means of establishing the coordinate system. In this case, the rule may be displayed on the image on which the operation has been performed such that a relative position of the rule relative to the related reference object remains unchanged before and after the operation.

In this embodiment of the present disclosure, after a corresponding operation is performed on an image, coordinates of a reference object on the image and coordinates of a rule that is overlaid on the image and that is related to the reference object vary with the operation. Therefore, when a rotation operation and/or a zoom operation is performed, a rotation angle of the rotation operation and/or a zoom ratio of the zoom operation needs to be acquired in order to correspondingly adjust the rule related to the reference object. Optionally, in an embodiment, the calculating the coordinates of the rule after the operation may include calculating an operation parameter, where the operation parameter includes at least one of a rotation angle or a zoom ratio, and calculating, according to the operation parameter, the coordinates of the rule after the operation.

In this embodiment of the present disclosure, if image operation instructions are different, corresponding operation parameters are also different, that is, the operation parameter correspondingly varies with the image operation instruction.

In this embodiment of the present disclosure, the image operation instruction may include the following three types a rotation operation instruction, a zoom operation instruction, and a rotation operation and a zoom operation instruction. The three cases are separately described in the following.

In a first case, the image operation instruction is performing a rotation operation. In this case, calculating an operation parameter includes calculating a rotation angle, and calculating, according to the operation parameter, the coordinates of the rule after the operation includes calculating, according to the calculated rotation angle, the coordinates of the rule after the operation.

In a second case, the image operation instruction is performing a zoom operation, calculating an operation parameter includes calculating a zoom ratio, and calculating, according to the operation parameter, the coordinates of the rule after the operation includes calculating, according to the calculated zoom ratio, the coordinates of the rule after the operation.

In a third case, the image operation instruction is performing a rotation operation and a zoom operation. Calculating an operation parameter includes calculating a rotation angle and a zoom ratio, and calculating, according to the operation parameter, the coordinates of the rule after the operation includes calculating, according to the rotation angle and the zoom ratio that are calculated, the coordinates of the rule after the operation.

A specific operation parameter is calculated in the foregoing manner, and then the coordinates of the rule in the coordinate system after the operation may be calculated according to the specific operation parameter. In this way, it is finally ensured that the relative position of the rule relative to the reference object remains unchanged before and after the operation.

Optionally, in another embodiment of the present disclosure, after each operation, an effective condition may be set for an image displayed after the operation, and the image is redisplayed when the effective condition is satisfied. Further, in this embodiment of the present disclosure, the image on which the operation has been performed may be referred to as a first image, an image that is obtained after an operation is performed on the first image is referred to as a second image, an image that is obtained after an operation is performed on the second image is referred to as a third image, and the rest may be deduced by analogy. In addition to steps 11 to 13, the image processing method provided in this embodiment of the present disclosure may also include setting an effective condition for the first image, and redisplaying the first image when the effective condition is satisfied.

Certainly, for images displayed after subsequent operations, for example, the second image and the third image, effective conditions may also be set. The second image or the third image may also be redisplayed when the effective condition is satisfied.

When the first image does not satisfy the effective condition and a subsequent operation is performed on the image, an image that is obtained after the subsequent operation is performed is displayed. Further, if an effective condition is set for the first image, when the first image does not satisfy the effective condition and an operation is performed on the first image according to an image operation instruction at this time, an image that is obtained after the operation is performed on the first image is directly displayed. When an operation is performed subsequently according to the image operation instruction, once the effective condition for the first image is satisfied, the first image is directly displayed.

Figure 3A:
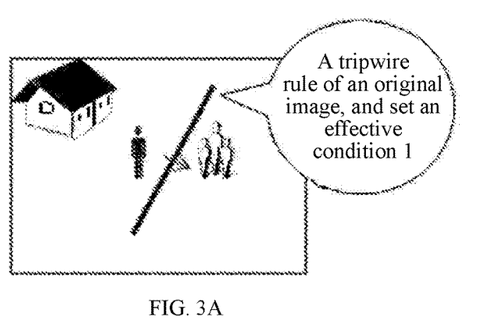
FIG. 3A, FIG. 3B, FIG. 3C, and FIG. 3D are schematic effect diagram when an effective condition is set.
Figure 3B:
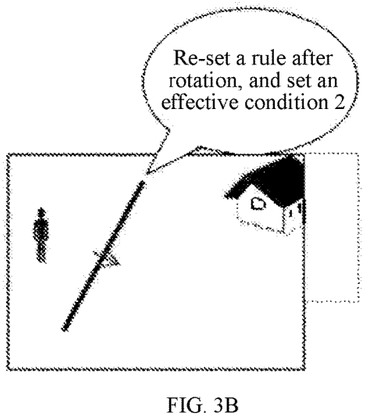
Figure 3C:
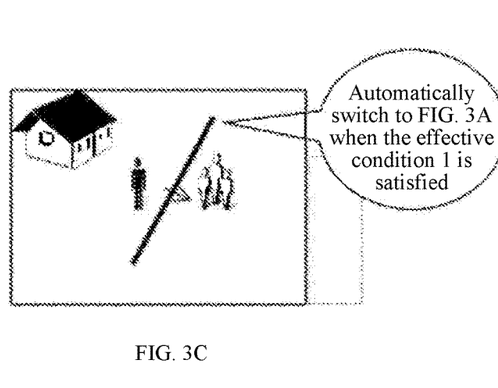
Figure 3D:
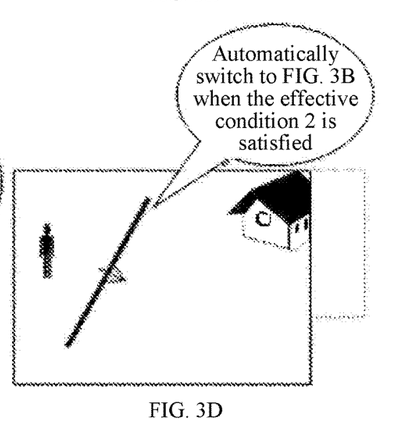

Referring to FIG. 3A, FIG. 3B, FIG. 3C, and FIG. 3D, FIG. 3A displays an original image and a tripwire rule overlaid on the image, and an effective condition 1 for redisplaying the image is set in FIG. 3A. FIG. 3B displays an image that is obtained after the image in FIG. 3A is rotated, and an effective condition 2 for redisplaying the image is also set in FIG. 3B. FIG. 3C shows that when the effective condition 1 set in FIG. 3A is satisfied, the image in FIG. 3A is redisplayed and it is ensured that the relative position of the rule, overlaid on the image, relative to the reference object remains unchanged (that is, FIG. 3C and FIG. 3A are exactly the same). FIG. 3D shows that when the effective condition 2 set in FIG. 3B is satisfied, the image in FIG. 3B is redisplayed and it is ensured that the relative position of the rule, overlaid on the image, relative to the reference object remains unchanged (that is, FIG. 3D and FIG. 3B are the same).

In this embodiment of the present disclosure, the effective condition includes but is not limited to effective time. The effective time may be a time length from a current moment, display time of a current image that exceeds a preset time length, or the like.

In this embodiment of the present disclosure, effective time may be set for each image on which the operation has been performed (for example, FIG. 3A and FIG. 3B), and the image correspondingly displayed when the effective time is satisfied. Moreover, it is ensured that the relative position of the rule, overlaid on the image, relative to the reference object remains unchanged (FIG. 3C, FIG. 3D . . . ). In this way, different rules may be used in different conditions.

To better understand the technical solutions of the present disclosure, the present disclosure is further described using specific embodiments herein.

This embodiment of the present disclosure provides, based on a camera with a PTZ function, an image processing method. The camera may include a lens, a sensor, an encoding processor, a CPU, a motor control board, and a control motor. The control motor includes at least one of a left control motor, a right control motor, an upper control motor, or a lower control motor. The motor control board controls (or the CPU directly implements control) the control motor. Related coordinates are recorded and calculated by the motor control board (or the CPU), and fed back to the processor in time. The encoding processor may acquire a zoom ratio for controlling a lens, and may feed the zoom ratio back to the CPU. It needs to be pointed out that, the encoding processor shown in the flowchart of this embodiment of the present disclosure includes a lens, a sensor, and an encoding processor, that is, the encoding processor can perform zoom processing in an integrated manner.

Figure 4:
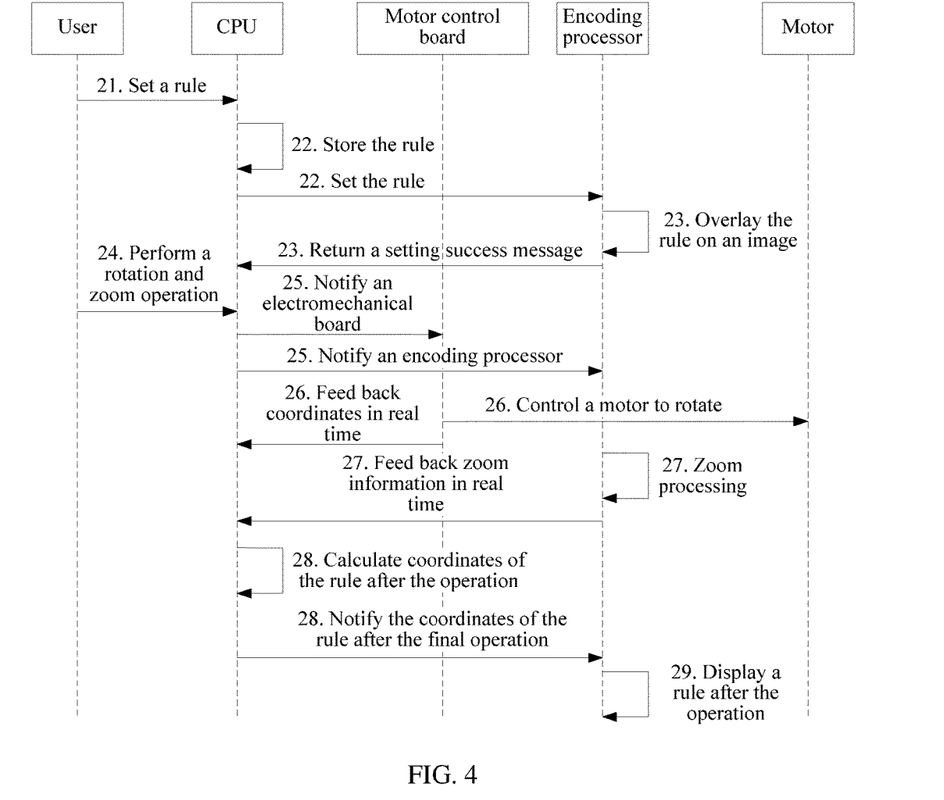
FIG. 4 is a control logic flowchart of an image processing method according to an embodiment of the present disclosure.

An embodiment of the present disclosure provides a flowchart of an image processing method. Referring to FIG. 4, the method includes the following steps.

Step 21: A user sets a tripwire or geometric rule in a CPU using a client of a management server or a client of a digital camera.

Step 22: The CPU stores the corresponding rule to a memory, and sets the rule in an encoding processor.

Step 23: The encoding processor overlays the rule on an image, and returns a setting success message to the CPU.

In this embodiment of the present disclosure, the rule overlaid on the image is relative to a reference object. For each rule on the image, the image includes a reference object related to the rule.

Step 24: The user delivers, using the client of the management server or the client of the digital camera, an image operation instruction of performing rotation and zoom on the image.

It needs to be pointed out that, this embodiment is described using an image operation instruction of rotation and zoom as an example. Certainly, in this embodiment of the present disclosure, the instruction may also be only a rotation operation or a zoom operation.

In addition, it should be noted that before a camera initially starts, a coordinate system may be pre-established, that is, a two-dimensional coordinate is established using a sensor center as an origin of the two-dimensional coordinate system. Both a zoom ratio and an initial angle of the camera are recorded and determined, where the motor control board and the encoding processor are used respectively for notifying the CPU of the initial angle and the zoom ratio such that the CPU performs storing and processing.

Step 25: After receiving a corresponding command, the CPU notifies both the motor control board and the encoding processor.

Step 26: The motor control board controls a motor to rotate with a scale, calculates new coordinates of the rule on the image when controlling the motor to rotate with the scale, and feeds the new coordinates back to the CPU in real time.

In this embodiment of the present disclosure, the coordinates of the rule are relative to the pre-established two-dimensional coordinate. A manner of establishing the coordinate system includes but is not limited to using a sphere center point of a sphere formed by the rotation of the camera as the origin of the two-dimensional coordinate system.

Step 27: The encoding processor performs zoom processing, calculates a zoom ratio simultaneously, and feeds the zoom ratio back to the CPU in real time.

Step 28: After acquiring the coordinates of the rule and the zoom ratio, the CPU calculates, according to the coordinates and the zoom ratio, final coordinates of the rule after the operation, and notifies the encoding processor of the final coordinates of the rule.

Step 29: The encoding processor displays the rule on the image on which the operation has been performed such that a relative position of the rule relative to the reference object remains unchanged before and after the operation.

The following describes, in detail with reference to the accompanying drawings, an algorithm of enabling the relative position of the rule relative to the reference object to remain unchanged before and after the operation.

It needs to be pointed out that, in this embodiment of the present disclosure, the coordinates of the dome camera (or the camera) are a concept of relative coordinates, and may be an angle coordinate that is established using the sphere center point of the sphere formed by the rotation of the camera as the origin and using a direction of the dome camera as a reference. Coordinates of a reference object refer to two-dimensional coordinates established using a picture center as an origin.

In this embodiment of the present disclosure, a detailed algorithm of enabling the relative position of the rule (including a tripwire or a region) relative to the reference object for the rule to remain unchanged may be considered from two aspects, that is, a rotation operation case and a zoom operation case.

In this embodiment of the present disclosure, some particular reference points on the rule may be selected to replace the whole rule, and the coordinates of the rule can be determined by determining the coordinates of the reference points.

The following first describes the rotation operation case. In this embodiment of the present disclosure, an algorithm in the rotation operation case includes a detailed algorithm of moving a reference point to a picture center (the sensor center) and a detailed algorithm of calculating coordinates of the moved reference point after the dome camera is rotated.

The detailed algorithm of moving the reference point to the sensor center includes the following. Rotation of a camera module may be divided into two types, that is, a vertical rotation and a horizontal rotation. The vertical rotation may be processed first, and a method of processing the horizontal rotation is similar to the method of processing the vertical rotation, and the camera module is instructed to rotate by an angle when a corresponding angle by which the camera module needs to rotate is obtained.

Figure 5:
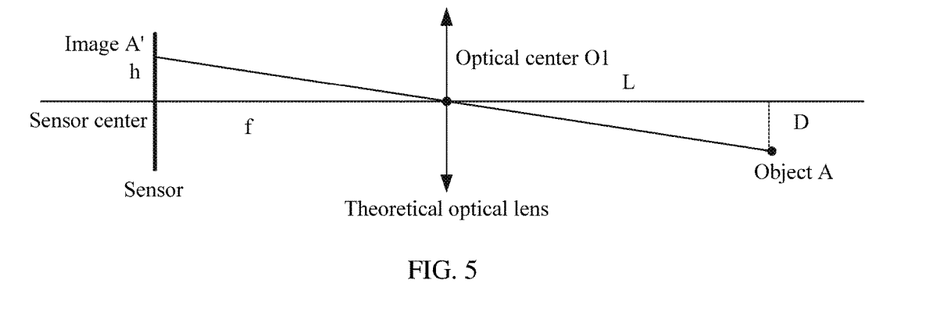
FIG. 5 is an optical imaging diagram.

A horizontal direction: as shown in an optical imaging diagram in FIG. 5, a reference point A' is selected from a rule. Assuming that the reference point A' actually corresponds to a real object A (that is, A' is an image of the real object A on a sensor), a distance of the object A from a theoretical optical lens is L, and a distance by which the object A deviates from a central line of an optical system is D, the lens moves the point A to a sensor center position, and an angle by which the camera module needs to rotate horizontally is $arctg(D/L)$.

To determine the angle by which the camera module rotates horizontally, $D/L$ needs to be calculated first. It may be obtained that $D/L=h/f$ according to a related mathematical theory, where h refers to a distance of an imaging point of the point A on the sensor from the center point of the sensor, and f refers to a focal length of the lens, and $h=k1*W$, where W represents a physical width (sensor_width) of the sensor, and k1 represents a ratio of a distance of the reference point from the picture center in a horizontal direction to a picture width.

Therefore, it may be calculated that the angle by which the camera module needs to rotate horizontally is $arctg(D/L)=arctg(k1*W/f)$.

Similarly, it may be obtained that an angle by which the camera module needs to rotate in a vertical direction as $arctg(k2*H/f)$, where H is a physical height of the sensor, and k2 represents a ratio of a distance of the reference point from the picture center in a vertical direction to a picture height.

After the angles by which the camera module needs to rotate in the horizontal and vertical directions are calculated, a position of the moved reference point after the dome camera is rotated is then calculated.

The detailed algorithm of calculating the position of the moved reference point after the dome camera is rotated includes calculating coordinates of the dome camera when the reference point is rotated to the sensor center, and calculating, according to the coordinates of the dome camera when the reference point is rotated to the sensor center, coordinates of the reference point on the sensor after the rotation.

The following describes the foregoing process one by one in detail.

A reference point is still selected from a region or a tripwire. Supposing that initial coordinates of the reference point that is before the rotation are $(x1, y1)$, it can be known that PTZ coordinates of the dome camera are $(p1, q1)$. The coordinates of the reference point need to be recalculated when the dome camera rotates to new coordinates $(p2, q2)$, where p1 in the foregoing is a horizontal angle coordinate, q1 is a vertical angle coordinate, a focal length corresponding to the coordinates $(p1, q1)$ is f1, and a focal length corresponding to $(p2, q2)$ is f2.

(1) The coordinates of the dome camera when the reference point is rotated to the sensor center are calculated.

In this embodiment of the present disclosure, the reference point $(x1, y1)$ may be rotated to the sensor center. For ease of description, supposing that the coordinates of the sensor center are $(x0, y0)$, and when the reference point is rotated to the sensor center, supposing that the horizontal and vertical angle of the dome camera at this time is $(p0, q0)$, it can be obtained from the foregoing detailed algorithm of moving the reference point to the sensor center $p1-p0=arctg((x1-x0)/a$ total quantity of horizontal pixels on the picture$*W/f1)$, and $q1-q0=arctg((y1-y0)/a$ total quantity of vertical pixels on the picture$*H/f1)$, where $(x1-x0)/a$ total quantity of horizontal pixels on the picture is k1 mentioned above.

Because the focal length f1 corresponding to the coordinates $(p1, q1)$ may be determined according to a zoom ratio, the coordinates $(p0, q0)$ of the dome camera may be calculated.

(2) The coordinates of the reference point on the sensor after the rotation are calculated according to the coordinates of the dome camera when the reference point is rotated to the sensor center.

When the dome camera rotates to $(p2, q2)$, supposing that a specific imaging position of the reference point on a sensor plate is $(x2, y2)$, it may be obtained based on the foregoing formula $(x2-x0)/a$ total quantity of horizontal pixels on the picture$*W/f2=tg(p2-p0)$, and $(y2-y0)/a$ total quantity of vertical pixels on the picture$*H/f2=tg(q2-q0)$, where the focal length f2 corresponding to the coordinates $(p2, q2)$ may be determined according to the zoom ratio.

$(x2, y2)$, that is, the coordinate position of the reference point on the sensor after the rotation, may be calculated according to the foregoing formula.

The coordinates of the reference point after the operation may be directly determined using the foregoing algorithm when an image operation instruction is performing a rotation operation and a zoom operation.

When an image operation instruction is only performing a rotation operation, because zoom is not involved, $f1=f2$ in the foregoing formula in this case. Similarly, the coordinates of the reference point after the operation may be directly determined using the foregoing formula.

When an image operation instruction is only performing a zoom operation, only a corresponding multiple difference is multiplied when a vertex of a region or line is calculated. For example, it is assumed that the rule is a square region, the calculated $(x2, y2)$ is $(50, 50)$, an original multiple is 1, the length and the width are 10, and original coordinates of four vertices are $(45, 45)$, $(45, 55)$, $(55, 45)$, and $(55, 55)$, and a current multiple is 2. Then, current coordinates of the four vertices after calculation are (40, 40), (40, 60), (60, 40), and (60, 60). That is, both the length and the width are twice of the original ones.

By means of the foregoing detailed algorithm, the coordinates of the reference point after the operation can be determined, and further, the coordinates of the rule are determined and the rule is displayed on the image on which the operation has been performed such that the relative position of the rule relative to the reference object remains unchanged before and after the operation.

Figure 6A:
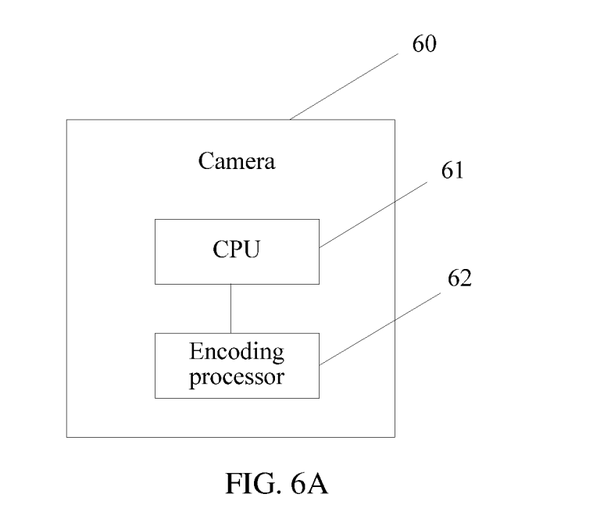
FIG. 6A is a structural block diagram of a camera according to an embodiment of the present disclosure.

FIG. 6A is a structural block diagram of a camera according to an embodiment of the present disclosure. Referring to FIG. 6A, the camera 60 includes a CPU 61 and an encoding processor 62, where the CPU 61 is configured to receive an image operation instruction, where the image operation instruction includes performing at least one of a rotation operation or a zoom operation. The CPU 61 is further configured to perform an operation on an image according to the image operation instruction, where the image is overlaid with a rule which is a tripwire or a geometric region and includes a reference object for the rule, and the encoding processor 62 is configured to display the rule on the image on which the CPU 61 has performed the operation such that a relative position of the rule relative to the reference object remains unchanged before and after the operation.

In an embodiment, the CPU 61 is further configured to calculate coordinates of the rule in a pre-established coordinate system after the operation, and the encoding processor 62 is further configured to display, according to the coordinates of the rule after the operation, the rule on the image on which the operation has been performed such that the relative position of the rule relative to the reference object remains unchanged before and after the operation.

In an embodiment, the CPU 61 may be further configured to acquire an operation parameter, where the operation parameter includes at least one of a rotation angle or a zoom ratio, and calculate, according to the operation parameter, the coordinates of the rule in the pre-established coordinate system after the operation.

Figure 6B:
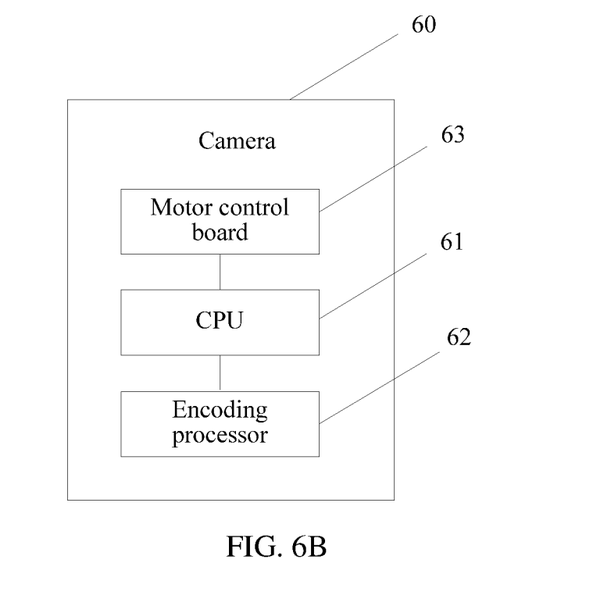
FIG. 6B is a structural block diagram of another camera according to an embodiment of the present disclosure.

Optionally, in another embodiment, referring to FIG. 6B, the camera 60 further includes a motor control board 63, where when the image operation instruction is performing a rotation operation, the motor control board 63 is configured to calculate a rotation angle, and notify the CPU 61 of the calculated rotation angle, and the CPU 61 is further configured to calculate, according to the rotation angle notified by the motor control board 63, the coordinates of the rule in the pre-established coordinate system after the operation.

Optionally, the CPU 61 may be further configured to determine coordinates of a preselected reference point in the rule before an operation, calculate, according to the calculated rotation angle and the coordinates of the reference point before the operation, coordinates of a dome camera that are corresponding to a current picture when the reference point is rotated to a picture center, calculate, according to the coordinates of the dome camera that are corresponding to the current picture when the reference point is rotated to the picture center, coordinates of the reference point after the operation, and determine, according to the coordinates of the reference point after the operation, the coordinates of the rule after the operation.

Optionally, in another embodiment, the encoding processor 62 is further configured to calculate a zoom ratio, and the CPU 61 may be further configured to calculate, according to the zoom ratio calculated by the encoding processor 62, the coordinates of the rule after the operation.

Optionally, in another embodiment, the camera 60 further includes a motor control board 63, where when the image operation instruction is performing a rotation operation and a zoom operation, the motor control board 63 is configured to calculate a rotation angle. The encoding processor 62 is further configured to calculate a zoom ratio when the image operation instruction is performing a rotation operation and a zoom operation, and the CPU 61 is further configured to calculate, according to the rotation angle calculated by the motor control board 63 and the zoom ratio calculated by the encoding processor 62, the coordinates of the rule after the operation.

Optionally, the CPU 61 may be further configured to select a reference point in the rule and determine coordinates of the reference point before an operation, calculate, according to the rotation angle and the zoom ratio that are calculated and the coordinates of the reference point before the operation, coordinates of a dome camera that are corresponding to a current picture when the reference point is rotated to a picture center, calculate, according to the coordinates of the dome camera that are corresponding to the current picture when the reference point is rotated to the picture center, coordinates of the reference point after the operation, and determine, according to the coordinates of the reference point after the operation, the coordinates of the rule after the operation.

In an embodiment, optionally, the CPU 61 is further configured to set an effective condition for the image on which the operation has been performed, and redisplay the first image when the effective condition is satisfied.

It should be noted that, FIG. 6A and FIG. 6B only show some key components of the camera that are mainly involved in the present disclosure. Such display is to better highlight emphasis of the present disclosure, and does not represent that the camera 60 is only provided with the components shown in the figure.

To better understand the camera provided in this embodiment of the present disclosure, the following describes the hardware logical architecture of the camera in detail.

Figure 7:
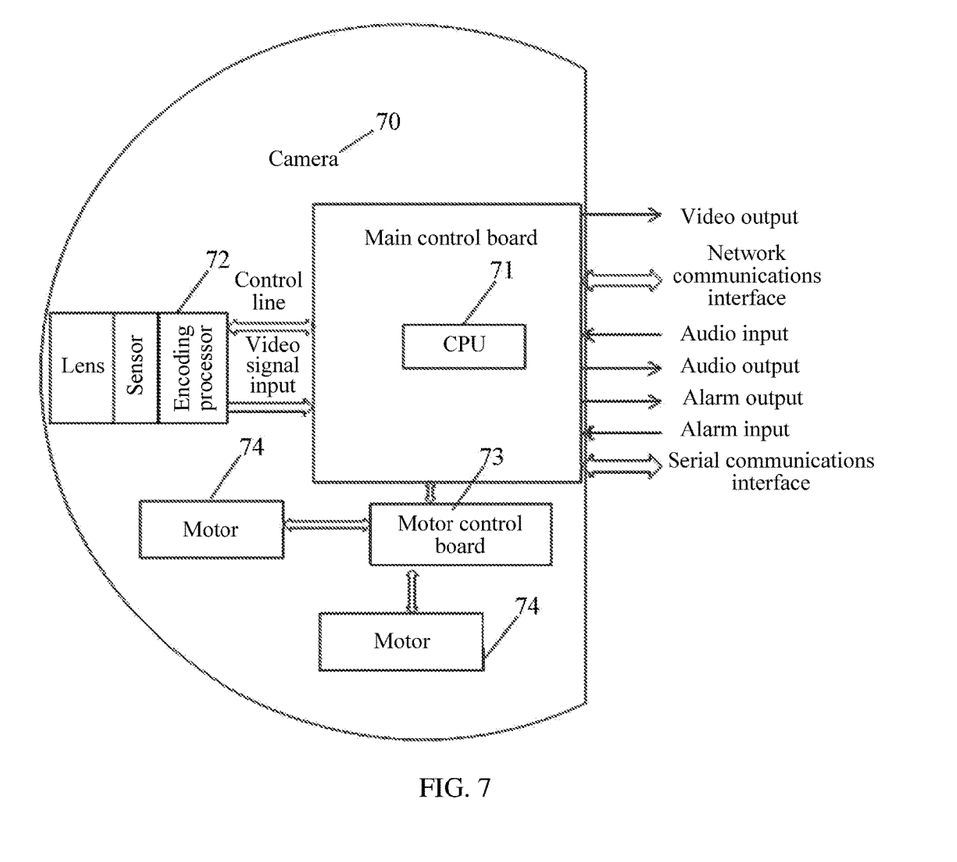
FIG. 7 is a schematic diagram of a hardware logical architecture of a camera according to an embodiment of the present disclosure.

Referring to FIG. 7, the camera 70 may include a CPU 71, an encoding processor 72, a motor control board 73, and a motor 74. The CPU 71 receives an image operation instruction, and instructs, according to the image operation instruction, the encoding processor 72 and/or the motor control board 73 to perform corresponding operations. For example, when the image operation instruction is performing a rotation and zoom operation, the CPU 71 notifies the motor control board 73 of a rotation instruction, and notifies the encoding processor 72 of a zoom instruction. After receiving the instruction of the CPU 71, the motor control board 73 controls the motor 74 to rotate. The motor 74 may include at least one of a left control motor, a right control motor, an upper control motor, or a lower control motor, and is configured to control a camera lens to rotate such that a lens image rotates. After receiving the instruction of the CPU 71, the encoding processor 72 controls the lens to perform zoom processing.

In this embodiment of the present disclosure, the motor control board 73 controls (or the CPU 71 directly implements control) the motor 74. Related coordinates are recorded and calculated by the motor control board 73 (or the CPU 71), and fed back to the CPU 71 in real time. The encoding processor 72 may acquire a zoom ratio for controlling a lens, and may feed the zoom ratio back to the CPU 71. The CPU 71 is configured to calculate, according to the coordinates fed back by the motor control board 73 and the zoom ratio fed back by the encoding processor 72, coordinates of a rule after the operation, and instructs the encoding processor 72 to display, on the lens, the rule after the operation.

Certainly, it needs to be pointed out that, the camera in this embodiment of the present disclosure may also include other components, and the other components may be, for example, a lens and a sensor. The other components function regularly, and are not described herein.

It should be noted that, the camera provided in the foregoing embodiment and the embodiment of the image processing method belong to a same conception. For a specific implementation process, refer to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image processing method, implemented by a camera, wherein the image processing method comprises:
   receiving, by the camera, an image operation instruction, wherein the image operation instruction comprises performing at least one of a rotation operation or a zoom operation;
   performing, by the camera, an operation on an image according to the image operation instruction, wherein the image is overlaid with an intelligent analysis rule, and wherein the intelligent analysis rule comprises either a tripwire rule and a reference object for the tripwire rule or a geometric rule and a reference object for the geometric rule;
   calculating, by the camera, coordinates of the intelligent analysis rule in a pre-established coordinate system after the operation; and
   displaying, by the camera based upon the coordinates of the intelligent analysis rule in the pre-established coordinate system after the operation, the intelligent analysis rule on the image on which the operation has been performed such that a relative position of the intelligent analysis rule relative to the reference object remains unchanged before and after the operation,
   wherein the image on which the operation has been performed is a first image,
   wherein the image processing method further comprises:
      setting, by the camera, an effective condition for the first image; and
      redisplaying, by the camera, the first image when the effective condition is satisfied,
   wherein calculating the coordinates of the intelligent analysis rule after the operation comprises:
      calculating, by the camera, an operation parameter that comprises at least one of a rotation angle and a zoom ratio; and
      calculating, by the camera according to the operation parameter, the coordinates of the intelligent analysis rule after the operation,
   wherein the image operation instruction comprises performing the rotation operation,
   wherein calculating the operation parameter comprises calculating the rotation angle, and
   wherein calculating the coordinates of the intelligent analysis rule after the operation comprises calculating, by the camera according to the rotation angle, the coordinates of the intelligent analysis rule after the operation.

2. The image processing method of claim 1, wherein calculating the coordinates of the intelligent analysis rule after the operation comprises:
   selecting, by the camera, a reference point in the intelligent analysis rule;
   determining, by the camera, coordinates of the reference point before the operation;
   calculating, by the camera according to the rotation angle and the coordinates of the reference point before the operation, coordinates of a dome camera that correspond to a current picture when the reference point is rotated to a picture center;
   calculating, by the camera according to the coordinates of the dome camera that correspond to the current picture when the reference point is rotated to the picture center, coordinates of the reference point after the operation; and
   determining, by the camera according to the coordinates of the reference point after the operation, the coordinates of the intelligent analysis rule after the operation.

3. The image processing method of claim 1, wherein the image operation instruction comprises performing the rotation operation and the zoom operation, wherein calculating the operation parameter comprises calculating the rotation angle and the zoom ratio, and wherein calculating, according to the operation parameter, the coordinates of the intelligent analysis rule after the operation comprises calculating, by the camera according to the rotation angle and the zoom ratio that are calculated, the coordinates of the intelligent analysis rule after the operation.

4. The image processing method of claim 3, wherein calculating the coordinates of the intelligent analysis rule after the operation comprises:
   selecting, by the camera, a reference point in the intelligent analysis rule;
   determining, by the camera, coordinates of the reference point before the operation;
   calculating, by the camera according to the rotation angle and the zoom ratio that are calculated and the coordinates of the reference point before the operation, coordinates of a dome camera that correspond to a current picture when the reference point is rotated to a picture center;
   calculating, by the camera according to the coordinates of the dome camera that correspond to the current picture when the reference point is rotated to the picture center, coordinates of the reference point after the operation; and
   determining, by the camera according to the coordinates of the reference point after the operation, the coordinates of the intelligent analysis rule after the operation.

5. The image processing method of claim 1, further comprising displaying, by the camera, an image that is obtained after a subsequent operation is performed on the image when the effective condition is not satisfied and the subsequent operation is performed on the image.

6. The image processing method of claim 1, wherein the effective condition comprises effective time.

7. A camera, comprising:
a central processing unit configured to:
receive an image operation instruction, wherein the image operation instruction comprises performing at least one of a rotation operation and a zoom operation;
perform an operation on an image according to the image operation instruction, wherein the image is overlaid with an intelligent analysis rule, wherein the intelligent analysis rule comprises either a tripwire rule and a reference object for the tripwire rule or a geometric region rule and a reference object for the geometric region rule; and
calculate coordinates of the intelligent analysis rule in a pre-established coordinate system after the operation; and
an encoding processor coupled to the central processing unit and configured to display, based upon the coordinates of the intelligent analysis rule in the pre-established coordinate system after the operation, the intelligent analysis rule on the image on which the central processing unit has performed the operation such that a relative position of the intelligent analysis rule relative to the reference object remains unchanged before and after the operation,
wherein the image on which the operation has been performed is a first image,
wherein the central processing unit is further configured to:
set an effective condition for the image on which the operation has been performed;
redisplay the first image when the effective condition is satisfied;
acquire an operation parameter that comprises at least one of a rotation angle and a zoom ratio; and
calculate, according to the operation parameter, the coordinates of the intelligent analysis rule in the pre-established coordinate system after the operation,
wherein the camera further comprises a motor control board coupled to the central processing unit and when the image operation instruction comprises performing the rotation operation, the motor control board is configured to:
calculate the rotation angle; and
notify the central processing unit of the rotation angle, and
wherein the central processing unit is further configured to calculate, according to the rotation angle notified by the motor control board, the coordinates of the intelligent analysis rule in the pre-established coordinate system after the operation.

8. The camera of claim 7, wherein the central processing unit is further configured to:
determine coordinates of a preselected reference point in the intelligent analysis rule before the operation;
calculate, according to the rotation angle and the coordinates of the preselected reference point before the operation, coordinates of a dome camera that correspond to a current picture when the preselected reference point is rotated to a picture center;
calculate, according to the coordinates of the dome camera that correspond to the current picture when the preselected reference point is rotated to the picture center, coordinates of the preselected reference point after the operation; and
determine, according to the coordinates of the preselected reference point after the operation, the coordinates of the intelligent analysis rule after the operation.

9. The camera of claim 7, wherein when the image operation instruction is performing the rotation operation and the zoom operation, the motor control board is configured to calculate a rotation angle, and the encoding processor is further configured to calculate the zoom ratio, and the central processing unit is further configured to calculate, according to the rotation angle calculated by the motor control board and the zoom ratio calculated by the encoding processor, the coordinates of the intelligent analysis rule after the operation.

10. The camera of claim 9, wherein the central processing unit is further configured to:
select a reference point in the intelligent analysis rule;
determine coordinates of the reference point before the operation;
calculate, according to the rotation angle and the zoom ratio that are calculated and the coordinates of the reference point before the operation, coordinates of a dome camera that correspond to a current picture when the reference point is rotated to a picture center;
calculate, according to the coordinates of the dome camera that correspond to the current picture when the reference point is rotated to the picture center, coordinates of the reference point after the operation; and
determine, according to the coordinates of the reference point after the operation, the coordinates of the intelligent analysis rule after the operation.

11. An image processing method, implemented by a camera, wherein the image processing method comprises:
receiving, by the camera, an image operation instruction, wherein the image operation instruction comprises performing at least one of a rotation operation or a zoom operation;
performing, by the camera, an operation on an image according to the image operation instruction, wherein the image is overlaid with an intelligent analysis rule, and wherein the intelligent analysis rule comprises either a tripwire rule and a reference object for the tripwire rule or a geometric rule and a reference object for the geometric rule;
calculating, by the camera, coordinates of the intelligent analysis rule in a pre-established coordinate system after the operation; and
displaying, by the camera based upon the coordinates of the intelligent analysis rule in the pre-established coordinate system after the operation, the intelligent analysis rule on the image on which the operation has been performed such that a relative position of the intelligent analysis rule relative to the reference object remains unchanged before and after the operation,
wherein the image on which the operation has been performed is a first image,
wherein the image processing method further comprises:
setting, by the camera, an effective condition for the first image; and
redisplaying, by the camera, the first image when the effective condition is satisfied,
wherein calculating the coordinates of the intelligent analysis rule after the operation comprises:

calculating, by the camera, an operation parameter that comprises at least one of a rotation angle and a zoom ratio; and calculating, by the camera according to the operation parameter, the coordinates of the intelligent analysis rule after the operation, wherein the image operation instruction comprises performing the zoom operation, wherein calculating the operation parameter comprises calculating the zoom ratio, and wherein calculating, according to the operation parameter, the coordinates of the intelligent analysis rule after the operation comprises calculating, by the camera according to the zoom ratio, the coordinates of the intelligent analysis rule after the operation.

12. A camera, comprising:

a central processing unit configured to:
- receive an image operation instruction, wherein the image operation instruction comprises performing at least one of a rotation operation and a zoom operation;
- perform an operation on an image according to the image operation instruction, wherein the image is overlaid with an intelligent analysis rule, wherein the intelligent analysis rule comprises either a tripwire rule and a reference object for the tripwire rule or a geometric region rule and a reference object for the geometric region rule; and
- calculate coordinates of the intelligent analysis rule in a pre-established coordinate system after the operation; and an encoding processor coupled to the central processing unit and configured to display, based upon the coordinates of the intelligent analysis rule in the pre-established coordinate system after the operation, the intelligent analysis rule on the image on which the central processing unit has performed the operation such that a relative position of the intelligent analysis rule relative to the reference object remains unchanged before and after the operation, wherein the image on which the operation has been performed is a first image, wherein the central processing unit is further configured to:
- set an effective condition for the image on which the operation has been performed; and
- redisplay the first image when the effective condition is satisfied, wherein the central processing unit is further configured to:
- acquire an operation parameter that comprises at least one of a rotation angle and a zoom ratio; and
- calculate, according to the operation parameter, the coordinates of the intelligent analysis rule in the pre-established coordinate system after the operation, wherein the encoding processor is further configured to calculate the zoom ratio, and wherein the central processing unit is further configured to calculate, according to the zoom ratio calculated by the encoding processor, the coordinates of the intelligent analysis rule after the operation.

* * * * *